United States Patent
Gomes et al.

(10) Patent No.: US 7,275,926 B2
(45) Date of Patent: Oct. 2, 2007

(54) QUICK ASSEMBLY HOT RUNNER NOZZLE DESIGN

(76) Inventors: Manuel Gomes, 420 Sydenham Road, Flamborough, Ontario (CA) L9H 5E2; Harald Gaul, 1128 Line 1 North, Shanty Bay, Ontario (CA) L0L 2L0; Bounoth Meksavanh, 6535 Skipper Way, Unit 18, Mississauga, Ontario (CA) L5W 1P6; Beilei Yen, 1067 Dreamcrest Road, Mississauga, Ontario (CA) L5V 1N6; Anna Lozyk Romeo, 287 Pinnucko Trail, Aurora, Ontario (CA) L4G 7G2

( * ) Notice: Subject to any disclaimer, the term of this patent is extended or adjusted under 35 U.S.C. 154(b) by 87 days.

(21) Appl. No.: 10/868,757

(22) Filed: Jun. 17, 2004

(65) Prior Publication Data

US 2005/0031731 A1    Feb. 10, 2005

Related U.S. Application Data

(60) Provisional application No. 60/479,855, filed on Jun. 20, 2003.

(51) Int. Cl.
*A21C 3/00* (2006.01)
(52) U.S. Cl. ............... 425/185; 264/328.15; 425/190; 425/549
(58) Field of Classification Search ............... 425/185, 425/190, 549; 264/328.15
See application file for complete search history.

(56) References Cited

U.S. PATENT DOCUMENTS

| | | | | |
|---|---|---|---|---|
| 3,660,552 A | * | 5/1972 | Hinz et al. | 264/328.15 |
| 4,902,218 A | * | 2/1990 | Leonard et al. | 425/549 |
| 5,466,145 A | * | 11/1995 | Takahashi | 425/190 |
| 5,846,466 A | * | 12/1998 | Abe et al. | 425/549 |

* cited by examiner

Primary Examiner—Tim Heitbrink
(74) Attorney, Agent, or Firm—Elias Borges

(57) ABSTRACT

The present invention is a hot runner nozzle design consisting of a nozzle core with slotted flange seated inside a slotted nozzle housing, a nozzle tip seated on the nozzle core, and a nozzle tip seal seated on the nozzle tip. Furthermore, the present invention is a quick assembly hot runner nozzle design. The present nozzle design provides for the easy installation and removal of the nozzle by means of turning and sliding the nozzle. This provides for easy installation or removal of the nozzle when servicing the mold in the machine and without the complete disassembly of the hot runner mold. The seal located on the nozzle tip seals the tip area to avoid plastic leakage. Positioning the seal closer to the gate area also contributes in increased nozzle tip mass thus resulting in a better heat distribution profile along the nozzle tip, and especially in the area closer to the gate. This eliminates nozzle tip freeze up, a critical matter for inside center gate applications that may have extended nozzle tips or tight pitch applications. Furthermore, the seal seated on the nozzle tip allows for a better concentric alignment of the nozzle to gate. Also, positioning the seal close to the gate area decreases color change time because of less volume being trapped around the nozzle tip.

20 Claims, 3 Drawing Sheets

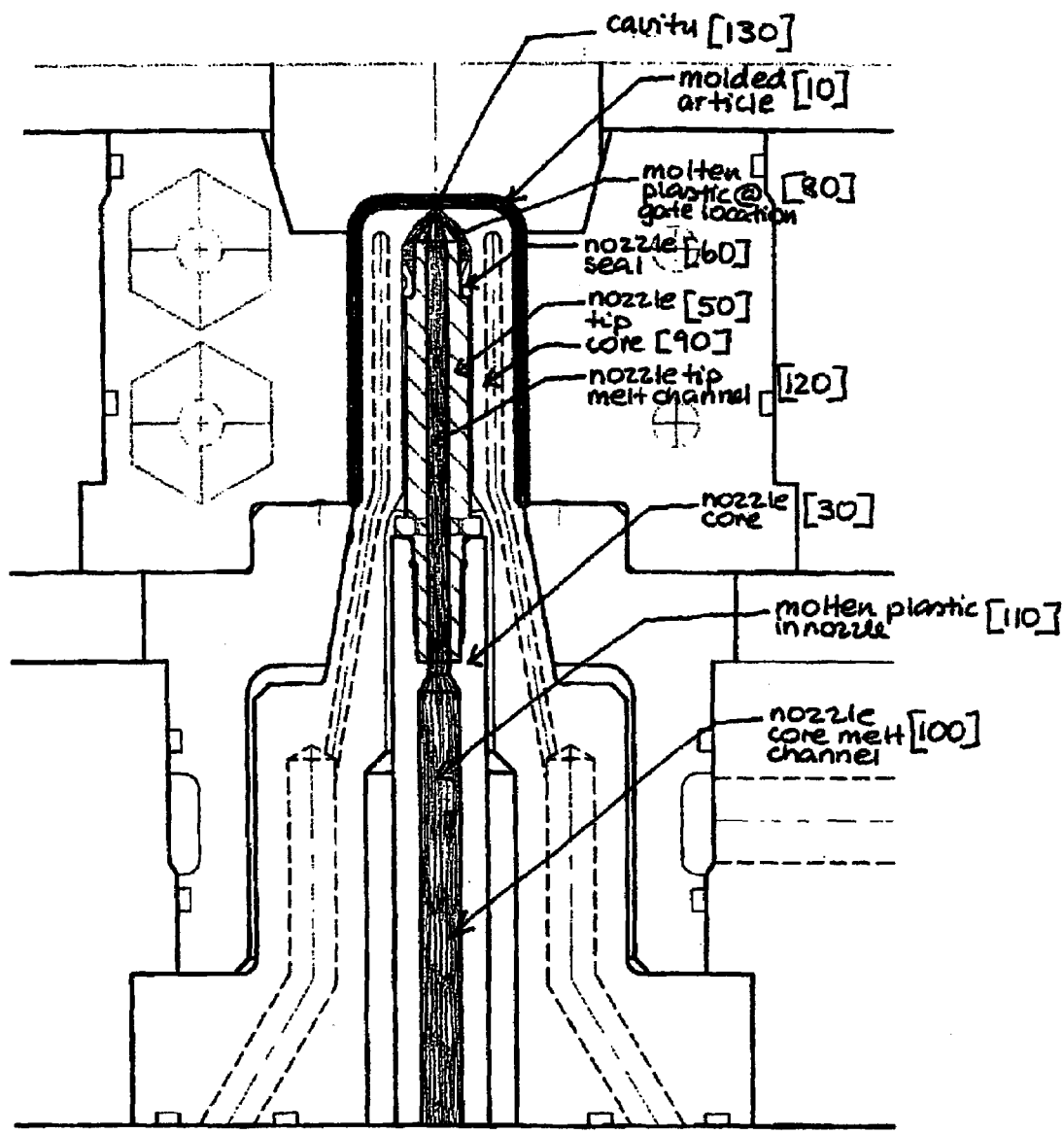
FIG 1B Cross Section View of the Nozzle (Enlarged partial upper section)

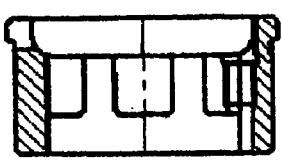
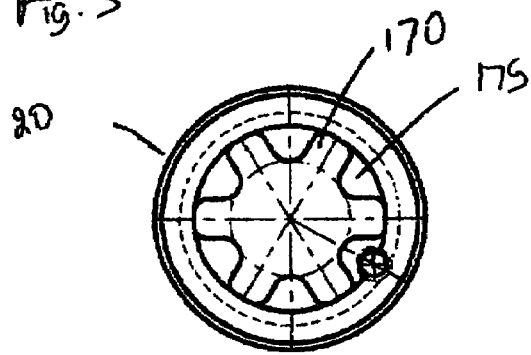
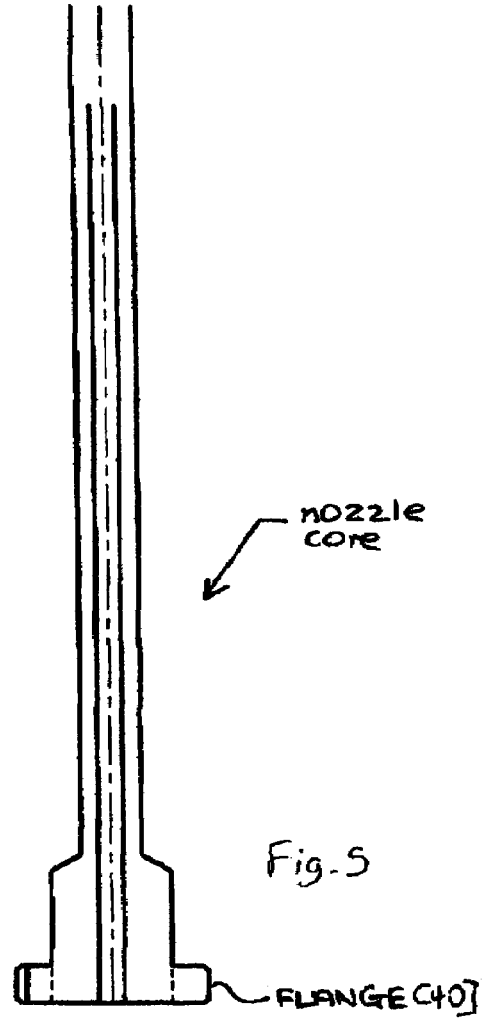
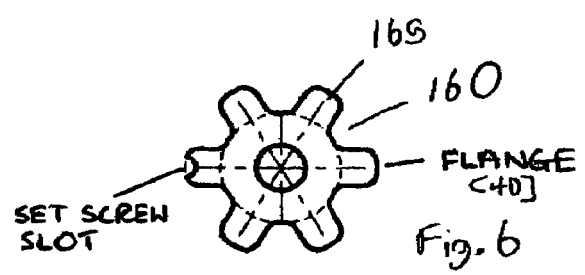

QUICK ASSEMBLY HOT RUNNER NOZZLE DESIGN

CROSS REFERENCE TO RELATED APPLICATION

The present application claims priority from provisional patent application Ser. No. 60/479,855 filed Jun. 20, 2003, the entirety of which is incorporated herein by reference.

FIELD OF THE INVENTION

The current invention relates to injection molding nozzles.

BACKGROUND OF THE INVENTION

Hot runner mold technology is directed at optimizing the flow of molten plastic material from the injection molding machine nozzle through the manifold and nozzle to the mold cavity. The molten plastic material leaving the machine nozzle is uniformly spread under high injection pressure throughout the manifold melt passages and then through the melt passage in the nozzle to the mold cavity of the article being molded therein. The number of melt channels and the number of nozzle assemblies are determined by either the number of desired gate areas or by the number of cavities to be filled. The melt channels are designed to evenly balance the flow of molten plastic and to fill the desired number of cavities in the mold at the same time. Furthermore, the manifolds and nozzles are heated by means of electric heating sources throughout the molding process to keep the melt temperature and pressure uniform once reaching the mold cavity of the molded article.

Demanding production requirements and demanding high quality of the molded article drives new ways to reduce maintenance costs. Maintenance costs are directly related to scheduled and unscheduled mold service during mold production runs. Scheduled mold service is a preventative maintenance schedule designed to either prolong the hot runner mold's life cycle or extend the use of the same mold for different application by means of replacing a few components. Unscheduled mold service is directly related to the unexpected mold downtime caused by the dynamic operating environment wherein the hot runner mold is subject to the high pressures, high temperatures and is used with abrasive and corrosive plastic materials. Thereupon, ways to maintain the hot runner mold in the machine are preferred, thus minimizing the downtime and maximizing the run time.

The nozzle design must be optimized to permit uniform temperature distribution along the nozzle body for equal cavity filling and improved molded article quality. The design of hot runner nozzles is particularly problematic in inside center gate applications. Inside center gating is used for cup-shaped plastic molded articles which must not have any external gate marks, or where the top surface of the product will be printed or a label applied. External gate marks can easily perforate the label, or may not be very appealing on the products, especially in the cosmetic industry. The design of hot runner nozzles for the inside center gate molding of small sized articles is particularly challenging since the nozzle size must be limited. However, limiting the nozzle size (diameter) decreases the mass of the nozzle thereby decreasing the heat conductivity of the nozzle which may result in nozzle freeze up.

There is a need for a nozzle that can be easily serviced during the scheduled and unscheduled servicing of the hot runner mold. At the same time there is a need for a smaller diameter and/or extended nozzle for inside center gate applications or other applications, both having uniform temperature distribution along the nozzle body extended to gate. Furthermore, there is also a need for a nozzle design suitable for use in color change applications which accommodates a reduced volume of accumulated plastic around the nozzle tip.

SUMMARY OF THE INVENTION

The present invention consists of a hot runner nozzle assembly for an injection mold comprising an elongated nozzle core having a longitudinal axis and opposite first and second ends and a nozzle core melt channel extending along the longitudinal axis. The assembly further includes a nozzle tip mounted to the first end of the nozzle core, the nozzle tip having a nozzle tip melt channel, the nozzle tip being coaxially aligned with the nozzle core such that the nozzle tip melt channel and the nozzle core melt channels are aligned. The nozzle core has a connector portion formed on the second end. The assembly also includes a hot runner manifold having a melt channel outlet and a nozzle housing mounted to the hot runner manifold adjacent the melt channel outlet. The nozzle housing and the connector portion form a quick connect coupling configured to mount the nozzle core on the manifold with the nozzle core's melt channel in alignment with the melt channel outlet of the hot runner manifold.

The present invention also consists of an improved hot runner nozzle assembly for an injection mold which includes a nozzle core, a nozzle tip, a nozzle housing for mounting the nozzle core to a hot runner manifold and a lock member for locking the nozzle core in the nozzle housing. The nozzle core consists of an elongated nozzle core having a longitudinal axis and opposite first and second ends and a nozzle core melt channel extending along the longitudinal axis. The nozzle tip is mounted to the first end of the nozzle core, the nozzle tip having a nozzle tip melt channel, the nozzle tip being coaxially aligned with the nozzle core such that the nozzle tip melt channel and the nozzle core melt channels are aligned. The nozzle tip has a valve gate. The nozzle core has a flange portion formed on the second end, the flange portion having a bulge extending perpendicular from the axis of the nozzle core. The nozzle housing is mounted to the hot runner manifold, the nozzle housing having an opening dimensioned and configured to receive the flange portion of the nozzle core, the nozzle housing having a shoulder portion and a slot, the slot being dimensioned to permit the bulge of the flange portion to pass through the slot when the bulge and the slot are aligned. The flange portion and the nozzle housing are dimensioned and configured to permit the flange to rotate in the housing between a first position wherein the bulge of the flange is aligned with the slot of the housing to permit the nozzle core to be inserted and removed from the housing and a second position wherein the bulge of the nozzle core abuts the shoulder of the housing thereby preventing the nozzle core from being removed from the nozzle housing. Finally, the assembly includes a locking member for releasably locking the flange in its second position.

The present invention is also directed towards an improved hot runner nozzle assembly for an injection mold including a nozzle core, a nozzle tip, a heating mantle, and a nozzle housing for mounting the nozzle core to a hot runner mantle. The nozzle core has a longitudinal axis and opposite first and second ends as well as a nozzle core melt channel extending along the longitudinal axis. The nozzle core is made of a first metal alloy. The nozzle tip has first and second ends, the first end of the nozzle tip being mounted to the first end of the nozzle core. The nozzle tip also has a nozzle tip melt channel, the nozzle tip being coaxially aligned with the nozzle core such that the nozzle tip melt channel and the nozzle core melt channels are aligned. The nozzle tip has a valve gate at the second end of the nozzle tip, the valve gate having a seal. The nozzle tip being made of a second metal alloy having a greater heat conductivity than the first metal alloy. The invention further includes a nozzle core heating mantle for heating the nozzle core. The nozzle core has a connector portion formed on the second end which is dimensioned and configured to mount to a nozzle housing which is in turn mounted to a hot runner manifold having a melt channel outlet.

BRIEF DESCRIPTION OF THE DRAWINGS

FIG. 1B is a cross section view of the nozzle installed in the hot runner mold (enlarged partial upper section).

FIG. 3 is a side view, partly in cross section, of the nozzle housing made in accordance with the present invention.

FIG. 4 is a top view of the nozzle housing shown in FIG. 3.

FIG. 5 is a side view of the bottom portion of the nozzle made in accordance with the present invention.

FIG. 6 is a bottom view of nozzle shown in FIG. 5 showing details of the flange portion of said nozzle.

In the drawings like characters of reference indicate corresponding parts in the different figures.

DETAILED DESCRIPTION OF THE PREFERRED EMBODIMENT

Figures 1A, 2:
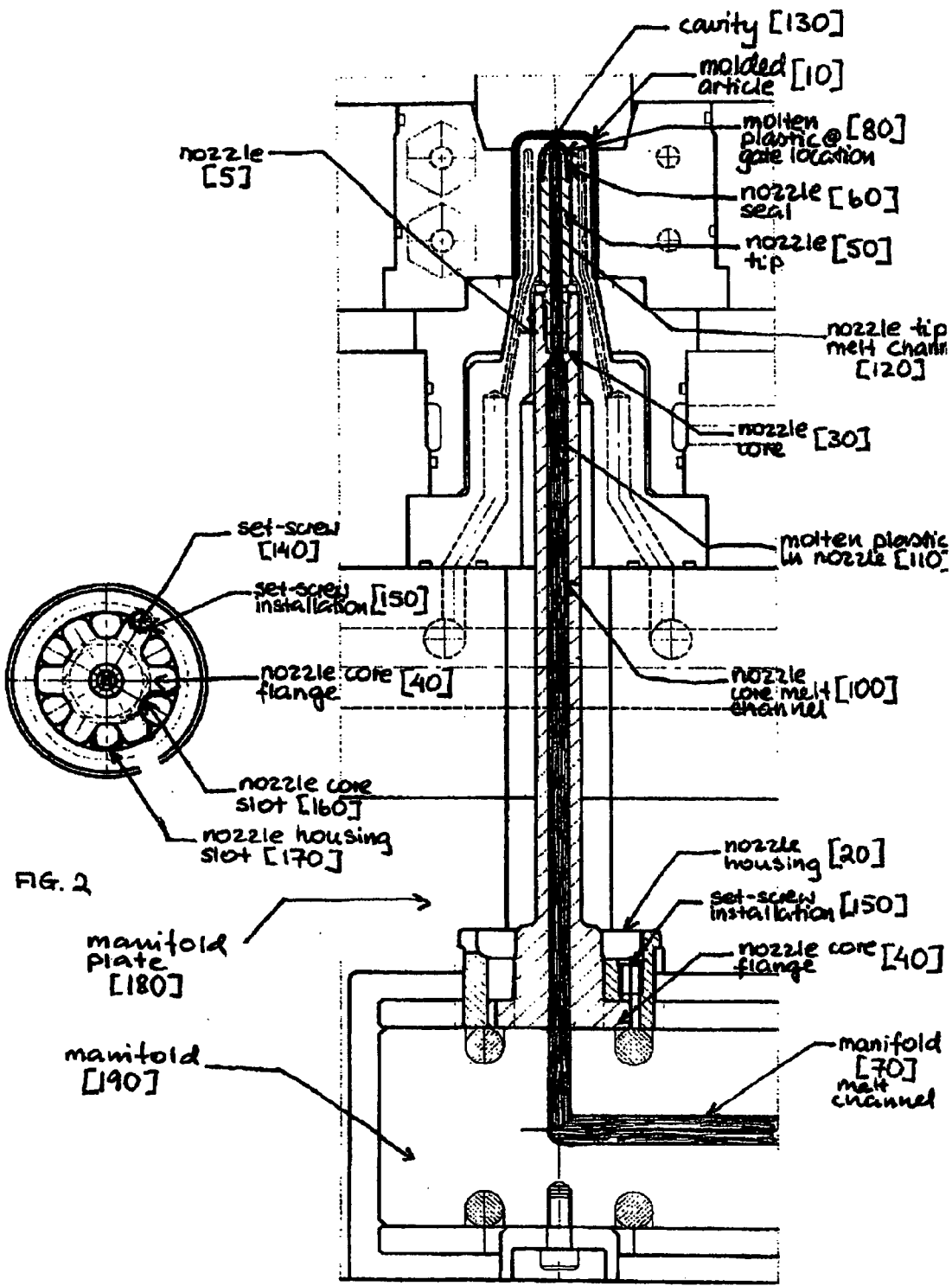
FIG. 1A is a cross section view of the nozzle installed in the hot runner mold.
FIG. 2 is a plan view of the nozzle assembly mainly showing slotted flange.

Referring to the cross sectional view of the nozzle 5 assembled in the hot runner mold on FIG. 1A shows a generalized molded inside center gated plastic article 10. The nozzle design consists of a slotted nozzle housing 20, a nozzle core 30 with connector portion (flange) 40, a nozzle tip 50 seated on the nozzle core 30 and a nozzle seal 60 seated the nozzle tip 50. The nozzle core 30 with flange 40 along with the nozzle tip 50 and nozzle seal 60 is seated inside the slotted nozzle housing 20. The nozzle housing 20 is installed in the manifold plate 180 and is usually not removed during the removal of other nozzle components 30, 50 and 60. The nozzle has a heating source along the body of the nozzle core 30 to keep the molten plastic 110 at constant temperature and constant flow in channel passages 100 and 120 of nozzle core 30 and nozzle tip 50, respectively.

During the injection process the molten plastic 110 flows from the manifold melt channel 70 to the melt channel 100 in the nozzle core 30. Leaving channel 100 from the nozzle core 30 molten plastic 110 enters melt channel 120 in the nozzle tip 50 and enters the gate 130. All melt channels are concentrically aligned.

As it was stated before, nozzle 5 is designed to be removed from the hot runner while still in the injection molding machine, permitting the current invention to be fully removable without completely disassembling the hot runner. This is achieved by the design of the slotted flange 40 on the nozzle core 30 and corresponding slots in the nozzle housing 20. Flange 40 and nozzle housing 20 form a quick connect coupling. As best seen in FIG. 3 to 6, flange 40 has a series of slots 160 separating bulges 165. Nozzle housing 20 has a series of slots 170 separating bulges (shoulders) 175. As best seen in FIG. 2, when assembled, the nozzle core's flange 40 is first aligned such that bulges 165 of nozzle core flange 40 can be inserted into slots 170 of nozzle housing 20. Flange 40 is then rotated to position slots 160 and 170 in alignment and place bulges 165 of the flange below shoulders 175 of the nozzle housing around the circumference of the nozzle core flange 40. The nozzle core flange 40 is seated under the resembled slots of the nozzle housing 20 with aligned 160 or 170 as shown in FIG. 2. The nozzle core flange 40 is locked in position by means of set-screw 140. When nozzle core flange 40 is in this locked position, bulges 165 abut shoulders 175 and the nozzle core cannot be removed from the nozzle housing.

The nozzle core 30 with attached nozzle tip 50 and nozzle seal 60 is removed from the nozzle housing 20 by first removing the set-screw 140, then rotating the nozzle core in a desire direction to position flange 40 into a first position wherein bulges 165 are aligned with the slots on the nozzle housing 20, thereby permitting the nozzle core to slide out of the housing in an axial direction. If nozzle tip 50 or seal 60 needs to be removed without a nozzle core 30, the set-screw 140 must not be removed. This is to lock the nozzle core 30 in place.

The installation method is performed in the reversed order. The nozzle core 30 with attached nozzle tip 50 and nozzle seal 60 is firstly aligned with slots 170 in the nozzle housing 20. Once fully located, the slotted flange 40 is pushed in against the manifold 190 flat surface, rotated by one or more slots 160 and aligned to the set-screw slot 150. The set-screw 140 is then installed to prevent the nozzle 5 from rotating during injection molding. Of course, the installation and removal of the nozzle 5 is performed while the various components are cold.

Referring now to FIG. 1B, in accordance to the current invention this nozzle 5 design is suitable for inside center gate applications. Since limitation exists on how close to the gate 130 the heating source (not shown) can be placed to the molded article 10, the principles of heat conductivity are used. In this current nozzle 5 design, the nozzle seal 60 is placed immediately adjacent to the gate 130. Gate 130 is seated on top of the nozzle tip 50. This nozzle seal 60 location allows for increased mass of the nozzle tip 50, thus the increased heat transfer from the heated nozzle core 30, thus the resulting uniform temperature distribution profile along the nozzle tip 50 all the way up to the gate 130.

Furthermore, in accordance to the current invention the nozzle 5 design is suitable for fast color changes. The location of the nozzle seal 60 being closer to the gate 130 reduces the volume of the molten plastic 80 being trapped in the space between the nozzle tip 50, nozzle seal 60 and the core 90 for the inside center gate molded article 10, or other components in conventional gate design not shown herein.

The present design has several advantages over the prior art. The present nozzle design facilitates the easy installation and/or removal of the nozzle for maintaining in-press serviceability to meet demanding production requirements; one being reduction of the downtime during scheduled and unscheduled mold service. The current design allows the nozzle to be replaced with considerable ease, and furthermore, without disassembly of the hot runner mold from the machine. Another aspect of the present nozzle assembly relates to the injection molding cycle times and molded plastic article quality during the injection molding process.

The nozzle seal being seated on the nozzle tip immediately adjacent the gate prevents any plastic leak around the nozzle tip and allows for an increase in the mass of the nozzle tip. Increasing the mass of the nozzle tip results in a more uniform heat distribution profile closer to the gate location. This eliminates gate freeze up problems for inside center gate applications. This seal also provides a better concentric alignment of the nozzle to the gate. Furthermore, locating the nozzle seal closer to the gate area results in less material to be removed during the color change, thus resulting in a further reduction of the mold downtime.

A specific embodiment of the present invention has been disclosed; however, several variations of the disclosed embodiment could be envisioned as within the scope of this invention. It is to be understood that the present invention is not limited to the embodiments described above, but encompasses any and all embodiments within the scope of the following claims.

We claim:

1. A hot runner nozzle assembly for an injection mold comprising:
   a. an elongated nozzle core having a longitudinal axis and opposite first and second ends and a nozzle core melt channel extending along the longitudinal axis,
   b. a nozzle tip mounted to the first end of the nozzle core, the nozzle tip having a nozzle tip melt channel, the nozzle tip being coaxially aligned with the nozzle core such that the nozzle tip melt channel and the nozzle core melt channels are aligned, the nozzle tip having a gate,
   c. the nozzle core having a flange portion formed on the second end, the flange portion having a bulge extending from the axis of the nozzle core,
   d. a nozzle housing mounted to a hot runner manifold, the nozzle housing having an opening dimensioned and configured to receive the flange portion of the nozzle core, the nozzle housing having a shoulder portion and a slot, the slot being dimensioned to permit the bulge of the flange portion to pass through the slot when the bulge and the slot are aligned, the flange portion and the nozzle housing being dimensioned and configured to permit the flange to rotate in the housing between a first position wherein the bulge of the flange is aligned with the slot of the housing to permit the nozzle core to be inserted and removed from the housing and a second position wherein the bulge of the nozzle core abuts the shoulder of the housing thereby preventing the nozzle core from being removed from the nozzle housing, and
   e. a locking member for releasably locking the flange in its second position.

2. A hot runner nozzle assembly as defined in claim 1 wherein the nozzle tip and the nozzle core are made of different metal alloys, the metal alloy forming the nozzle tip having a higher heat conductivity than the alloy forming the nozzle core.

3. A hot runner nozzle assembly as defined in claim 2 wherein the nozzle tip is made of an alloy of BeCu.

4. A hot runner nozzle assembly as defined in claim 3 wherein the nozzle tip further comprises a nozzle seal positioned immediately adjacent the gate.

5. A hot runner nozzle assembly for an injection mold comprising:
   a. an elongated nozzle core having a longitudinal axis and opposite first and second ends and a nozzle core melt channel extending along the longitudinal axis,
   b. a nozzle tip mounted to the first end of the nozzle core, the nozzle tip having a nozzle tip melt channel, the nozzle tip being coaxially aligned with the nozzle core such that the nozzle tip melt channel and the nozzle core melt channels are aligned,
   c. the nozzle core having a connector portion formed on the second end,
   d. a hot runner manifold having a melt channel outlet,
   e. a nozzle housing mounted to the hot runner manifold adjacent the melt channel outlet, the nozzle housing and the connector portion forming a quick connect coupling configured to mount the nozzle core on the manifold with the nozzle core's melt channel in alignment with the melt channel outlet of the hot runner manifold.

6. A hot runner nozzle as defined in claim 5 wherein the connector portion of the nozzle core forms a flange and wherein the nozzle housing has an opening dimensioned and configured to receive the flange, the nozzle housing being further dimensioned and configured to permit the nozzle flange to be rotated between a first position wherein the nozzle may be readily inserted or removed from the opening and a second position wherein the flange is firmly retained in the nozzle housing.

7. A hot runner nozzle as defined in claim 6 further comprising a locking member mounted to the nozzle housing for locking the flange in its second position.

8. A hot runner nozzle as defined in claim 7 wherein the locking member comprises a set screw which is dimensioned to prevent the flange from rotating when the flange is in its second position and when the screw is mounted in the housing.

9. A hot runner nozzle as defined in claim 6 wherein the flange has at least one perpendicularly projecting bulge and wherein the housing has a shoulder portion and at least one slot dimensioned to receive the bulge, the housing being dimensioned and configured to firmly retain the bulge against a shoulder portion when the flange is rotated into its second position.

10. A hot runner nozzle as defined in claim 9 further comprising a lock member for preventing the flange from rotating from its second position into its first position.

11. A hot runner nozzle as defined in claim 10 wherein the lock member comprises a set screw mountable in the housing.

12. A hot runner nozzle as defined in claim 1 wherein the lock member comprises a set screw mountable in the housing.

13. A hot runner nozzle as defined in claim 12 wherein the shoulder has a passage dimensioned and configured to receive the set screw.

14. A hot runner nozzle as defined in claim 1 wherein the flange portion has a plurality of bulges separated by a plurality of slots and wherein the nozzle housing has a plurality of shoulders separated by a plurality of housing slots, the bulges and slots of the flange and the shoulders and slots of the housing being dimensioned and configured to permit the flange portion to be inserted and removed from the housing when the bulges of the flange are aligned with the slots of the housing.

15. A hot runner nozzle assembly for an injection mold comprising:
   a. an elongated nozzle core having a longitudinal axis and opposite first and second ends and a nozzle core melt channel extending along the longitudinal axis, the nozzle core being made of a first metal alloy,
   b. a nozzle tip having first and second ends, the first end of the nozzle tip being mounted to the first end of the nozzle core, the nozzle tip having a nozzle tip melt channel, the nozzle tip being coaxially aligned with the nozzle core such that the nozzle tip melt channel and the nozzle core melt channels are aligned, the nozzle tip having a valve gate at the second end of the nozzle tip, the nozzle tip having a nozzle seal located immediately adjacent the second end of the nozzle tip, the nozzle tip being made of a second metal alloy, the second metal alloy having a greater heat conductivity than the first metal alloy, c. a nozzle core heating mantle for heating the nozzle core, d. the nozzle core having a connector portion formed on the second end, e. a hot runner manifold having a melt channel outlet, f. a nozzle housing mounted to the hot runner manifold adjacent the melt channel outlet, the nozzle housing and the connector portion configured to mount the nozzle core on the manifold with the nozzle core's melt channel in alignment with the melt channel outlet of the hot runner manifold.

16. A hot runner nozzle assembly as defined in claim 15 wherein the second alloy is an alloy of BeCu.

17. A hot runner nozzle assembly as defined in claim 15 wherein the first end has an opening dimensioned and configured to receive the nozzle tip.

18. A hot runner nozzle assembly as defined in claim 15 wherein the connector portion of the nozzle core and the housing and dimensioned and configured to form a quick connector.

19. A hot runner nozzle assembly as defined in claim 18 wherein the connector portion of the nozzle core forms a flange having a bulge and wherein the nozzle housing has a shoulder adjacent a slot, the slot of the housing dimensioned and configured to permit the bulge to pass thorough the slot when the bulge and the slot are aligned, the connector portion and the housing being further dimensioned and configured to permit the flange to rotate between a first position wherein the bulge of the flange and the slot of the housing are aligned and a second position wherein the bulge of the flange abuts against the shoulder of the housing preventing the nozzle core from being removed from the housing and further comprising a lock member for releasably locking the flange in its second position.

20. A hot runner nozzle assembly as defined in claim 19 wherein the lock member comprises a set screw and wherein the bulge of the flange and the shoulder of the housing have a passage for receiving the set screw.

* * * * *